March 13, 1973   W. STOG ET AL   3,720,474
EXPANSION JOINT
Filed Dec. 9, 1970

INVENTORS:
Wilhelm Stog
August Hrefter
BY
Walter Becker

United States Patent Office 3,720,474
Patented Mar. 13, 1973

3,720,474
EXPANSION JOINT
Wilhelm Stog, Waltrop, and August Krefter, Lunen, Germany, assignors to W. Stog KG, Industrie- und Rohrleitungsbau, Waltrop, Germany
Filed Dec. 9, 1970, Ser. No. 96,321
Claims priority, application Germany, Dec. 20, 1969,
P 69 49 269.9
Int. Cl. E01c 11/10
U.S. Cl. 404—47
5 Claims

ABSTRACT OF THE DISCLOSURE

An expansion joint for road sections joining with a bridge, or with another road section etc. forming a strip-like band from resilient materials, such as a rubber band having indentations at the lower surface thereof which are arranged parallel to the side joints and supports means including support ribs being arranged on supporting plates, said ribs lying in engagement with said indentations. The support means may comprise support shoulder having projections which engage with the resilient band as well as support ribs to secure the cast filling material used for the excisions of the drive way sections adjacent to the resilient band. Preferably the support shoulders rest on a shock absorbing layer or plate of plastics material and the resilient band is provided with stabilizing cams being inserted into the lower side thereof.

BACKGROUND OF THE INVENTION

For bridging expansion gaps between sections of bridges and roads, joints accommodating expansion and contraction of the sections are known which consists of overlapping sliding panels, toothed comb structures etc. It is further known to cover the gaps by extensible rubber strips or bands which are also used in various forms for filling drive way gaps. Although such embodiments of expansion joints are generally waterproof the means used for fastening the joints are exposed to atmospheric conditions and thus subject to wear within short periods of time.

It is further felt disadvantageous that structures being provided with rubber coverings do not compensate the effects of blows caused by the axle loads of rolling cars and other vehicles which frequently leads to repair work impairing total traffic conditions. Particularly these disadvantages occur with bridge gaps having movable supports and may require larger detours of the traffic. It is an object of the invention to overcome these disadvantages and to provide for an expansion joint which is fully supported and covered against moisture and which does not require attention.

SUMMARY OF THE INVENTION

The invention relates to improved expansion joints including a resilient band, said expansion joints being suited for fixed supports as well as for movable supports adjacent to bridging gaps or as a gap filling band.

In accordance with the invention there is provided an expansion joint for road sections joining with a bridge or with another road section etc., said expansion joint comprising a resilient band arranged within recesses in of the drive way and having channels at the lower surface thereof which are ararnged parallel to the side joints and support means and including support ribs arranged on supporting plates, said ribs lying in said channels.

The supporting plates of the support means which are arranged on both side of the joint or gap comprise support shoulders having projections which engage with the resilient band at the lower side thereof. The support shoulders further have support ribs to secure and limit the cast filling material used for the recesses of the drive way sections adjacent to the resilient band. Preferably the support shoulders are divided into sections which are held by spreader screw bolts within adjacent driveway sections said screw bolts being arranged in the intermediates spaces to be filled with cast filling material. Further the support shoulders are provided with angled support means at the upper surface thereof for supporting the rubber band against the cast filling compositions.

The support shoulders may rest on shock absorbing layers or plates of plastics material at one side or both sides of the disconnecting joint or gap.

According to a further feature of the invention in an embodiment of the expansion joint for movable bridge section joints, the support area of the resilient band at the movable bridge side is of greater depth than at the immovable other side of the drive way. The enlarged support area of the rubber band in this embodiment of the invention is provided with stabilizing cams being inserted into the lower side thereof.

An embodiment of examples of the expansion joints according to the invention is illustrated in the accompanying drawings.

DESCRIPTION OF THE PREFERRED EMBODIMENTS

Figure 1:
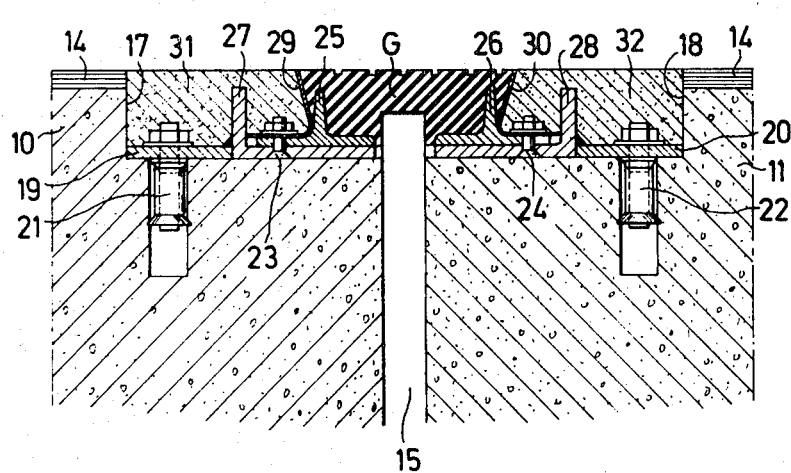
FIG. 1 is an expansion joint for rigid sections of roads and bridges respectively according to the invention.

In the drawings roadway sections of conventional construction are designated 10 and 11 for immovable joints and 12 and 13 for movable joints. In both drawings the upper surface of the roadway sections or bridge sections is designated 14, the separating gap of immovable joints is designated 15 and the separating gap of movable joints is designated 16.

On both sides of the gap 15 recesses 17 and 18 are arranged in the road sections 10 and 11 into which support plates 19 and 20 are fastened by spreader screw bolts 21 and 22 which are anchored in the lower base of the drive way.

The gap 15 or 16 respectively is covered by a strip or band of rubber or other resilient material G. The band G is provided with indentations or channels in the lower surface thereof which are arranged parallel to the side joints and which are engaged by support projections 25 and 26 fastened to the support plates 19 and 20 by screws 23 and 24. The support plates 19 and 20 further are provided with right angled ribs 27 and 28.

The fastening screws 23 and 24 for securing the flanged support members forming ribs 25 and 26 simultaneously serve to fasten angular support means 29 and 30 each having an upper edge which extends up to the drive way surface. The angular support means 29 and 30 form supports for the strip like band G as well as the limits for a cast filling material 31 and 32 which fills the recesses 17 and 18 up to the surface of the drive way surface 14.

Figure 2:
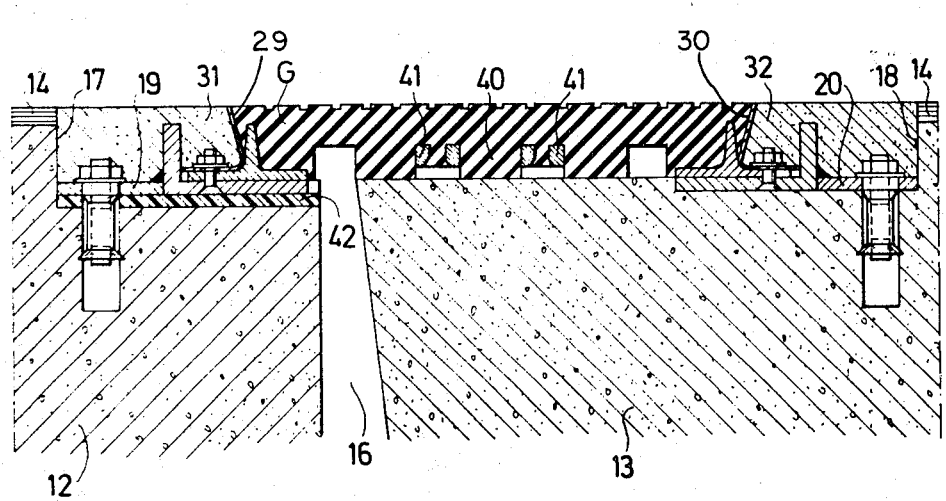
FIG. 2 is a sectional view illustrating an expansion joint for a bridge section.

The embodiment according to FIG. 2 shows a rubber band G which is broader at the bridge support section 13 than at the adjacent support section 12. The broader part 40 of the expansion joint cover of rubber or other resilient material is provided with stabilizing plates 41 which are inserted and vulcanized into the joint cover 40, the number and distribution of said plates being selected according to the local requirements.

All embodiments of the expansion joint according to the invention may have support plates 19 and 20 resting on an underlying base layer or plate 42 of shock and sound absorbing plastics material.

The strip G consists of rubber or resilient plastics material or of materials having similar properties which materials should be weather resistant and may have a finished and/or wear resistant surface and may be provided, if desired, with profiles which inhibit the danger of sliding. The strip G extends without interruptions over the total width of the road or bridge respectively. The support plates 19 and 20 as well as the support projections 25 and 26 and the support ribs 27 and 28 may be divided into sections which are each fastened by spreader screw bolts in the base of the road section.

The angular support means 29 and 30 comprise angular pieces which are arranged parallel to the edges of the gap 15 or 16 and are fastened by screws 23 and 24. The angular profile is selected to provide tight fitting of the rubber band G between the flange of the angular support means and the rib 25 or 26. Preferably the upstanding flanges of the angular pieces are somewhat inclined laterally in order to allow for complete filling of the laterally bent angled piece by the cast filling compositions 31 and 32.

The embodiments shown by example do not limit the possible embodiments of the invention. The width of the rubber strips and the width of the limits of the cast filling material can be adapted to the local requirements. The form of the insert for the expansion joint may be used besides for joints at bridges and also for gaps in road sections as well as for gaps in horizontal and vertical walls.

One advantage of the invention is the fact that all parts supporting and securing the gap insert are formed in a manner to provide for a weather resistant joint which is closed against moisture. The strip like rubber band G and the cast filling material respectively cover all fastening means against moisture thus making the joint free of any attendance. The gaps 15 and 16 may be made narrow enough to provide for shock free transition of rolling axle loads. The expansion joint of the invention does not cause any noise when passed over by vehicles. It is possible to provide the joint with existent sections of roads and bridges in a simple manner because only recesses 17 and 18 must be cut for insertion of the total construction of the expansion joint. The forces exerted by rolling loads are taken off uniformly. For this purpose the support projections or ribs 25 and 26 and the support ribs 27 and 28 and the angular support means 29 and 30 respectively are divided into sections of about one to two meters in length. These sections are each fastened and anchored by suitable means, such as the screws mentioned. The designations of FIG. 1 also are valid for the corresponding designations of FIG. 2 for corresponding structural means.

What is claimed is:

1. An expansion joint for adjacent roadway sections having a gap therebetween to allow expansion of said sections, said sections being recessed along their adjacent edges to form a groove along both sides of said space, said joint comprising a plate structure fixed to each section along the bottom of said groove, each of said plate structures having a flanged support projection providing a rib parallel to and spaced from said gap, an angular support means on each side of said gap parallel to said rib having a horizontal flange secured to said plate structure and an inclined flange diverging upwardly from the base of said rib to form a flared space, a strip of resilient material having channels on its under side receiving said ribs on opposite sides of said gap with the margins of said strip confined in and tightly fitting the flared spaces between said ribs and said inclined flanges, and cast filling material between said inclined flanges and the edges of said groove.

2. In an expansion joint according to claim 1, said strip of resilient material having perforated plates embedded in its under side spaced above the bottom of said groove.

3. In an expansion joint according to claim 2, in which one rib is spaced a greater distance from the gap than the other rib, and said perforated plates are embedded in the resilient material on the side having the greater space between the gap and rib.

4. Expansion joint as claimed in claim 1 wherein said supporting plates are divided into sections each section being fastened in the region which is to be filled with cast filling material by suitable anchoring means, such as spreader screw bolts.

5. Expansion joint as claimed in claim 1 wherein the support shoulders of the support means are provided with underlying base layers or plates of shock absorbing plastics material.

References Cited

UNITED STATES PATENTS

| | | | |
|---|---|---|---|
| 3,520,236 | 7/1970 | Sequaris | 94—18 |
| 3,466,987 | 9/1969 | Shimizu | 94—18 |
| 1,739,102 | 12/1929 | Strauss | 94—18 X |

NILE C. BYERS, JR., Primary Examiner

U.S. Cl. X.R.

14—16